US005336849A

United States Patent [19]
Whitney

[11] Patent Number: 5,336,849
[45] Date of Patent: Aug. 9, 1994

[54] RACEWAY ASSEMBLY FOR POWER AND COMMUNICATIONS CONDUCTORS

[75] Inventor: Charles A. Whitney, Canton, Conn.

[73] Assignee: The Wiremold Company, Hartford, Conn.

[21] Appl. No.: 822,627

[22] Filed: Jan. 17, 1992

[51] Int. Cl.5 ............... H01R 25/16; H01B 17/18; E04F 17/08

[52] U.S. Cl. ................. 174/48; 174/101; 52/220.5; 52/287.1; 439/114; 439/215

[58] Field of Search .......... 174/48, 49, 101, 95–98; 52/221, 287; 439/110, 113, 114, 115, 120, 215, 216, 212, 213

[56] References Cited

U.S. PATENT DOCUMENTS

| | | | |
|---|---|---|---|
| 1,942,137 | 1/1934 | Connell et al. | |
| 3,171,702 | 3/1965 | Schumacher et al. | 339/22 |
| 3,806,858 | 4/1974 | Larsile | 339/22 |
| 3,836,936 | 9/1974 | Clement | 174/48 X |
| 3,858,155 | 11/1974 | Lucan et al. | 315/27 |
| 4,156,795 | 5/1979 | Lacan | 174/48 X |
| 4,243,284 | 1/1981 | Humphreys | 339/21 |
| 4,462,650 | 7/1984 | Humphreys | 339/22 |
| 4,627,679 | 12/1986 | Billette de Villemeur | 339/21 |
| 4,800,696 | 1/1989 | Miller et al. | 52/221 |
| 4,905,433 | 3/1990 | Miller | 174/48 X |
| 5,024,614 | 6/1991 | Dola et al. | 439/114 |
| 5,025,603 | 6/1991 | Johnson | 52/221 |
| 5,057,646 | 10/1991 | Nichols et al. | 174/36 |
| 5,162,614 | 11/1992 | Bogiel et al. | 174/48 X |

FOREIGN PATENT DOCUMENTS

| | | | |
|---|---|---|---|
| 0149377 | 7/1985 | European Pat. Off. | |
| 1218323 | 1/1971 | United Kingdom | 174/48 |
| 2121615 | 12/1983 | United Kingdom | 174/48 |

Primary Examiner—Peter Dungba Vo
Attorney, Agent, or Firm—Hayes & Reinsmith

[57] ABSTRACT

A raceway includes a base and removable cover defining internal channels; discrete conductive shields are mounted in each channel in overlying relation to power and communications conductors therein; and a latching member is removably mounted between the cover and base continuously along coextending lengths of the latching member and the cover, the latching member being in interfering relation to cover movements required for removal of the cover from the base.

17 Claims, 3 Drawing Sheets

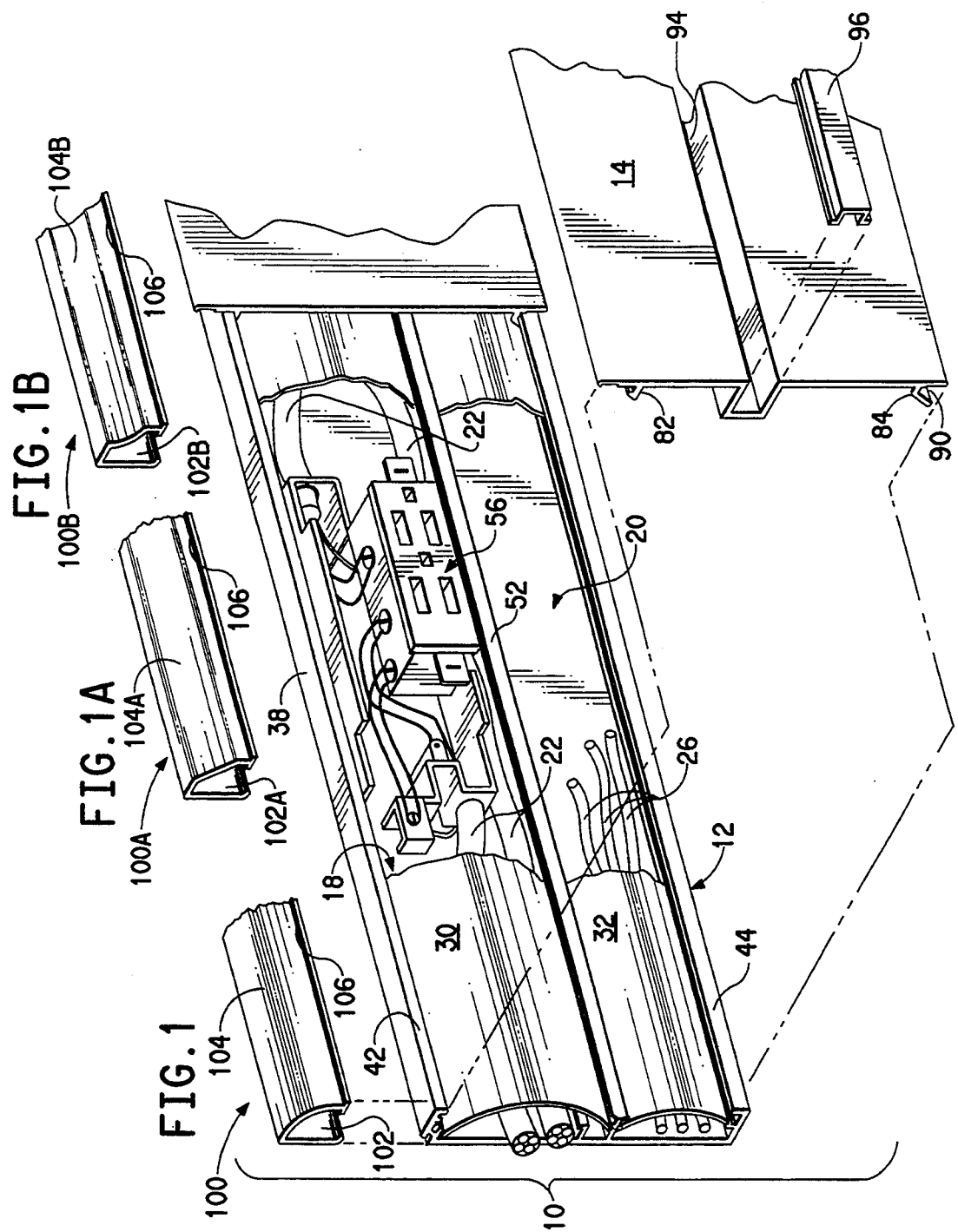

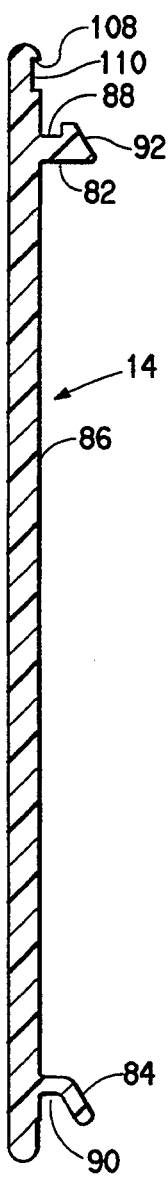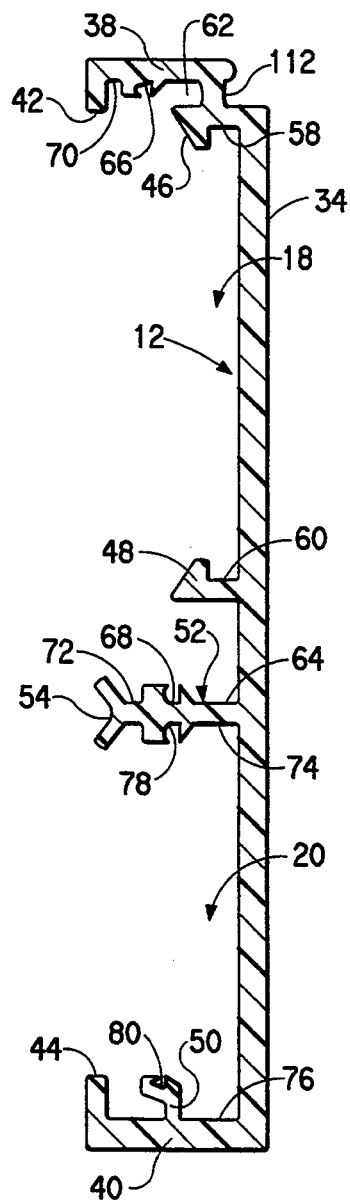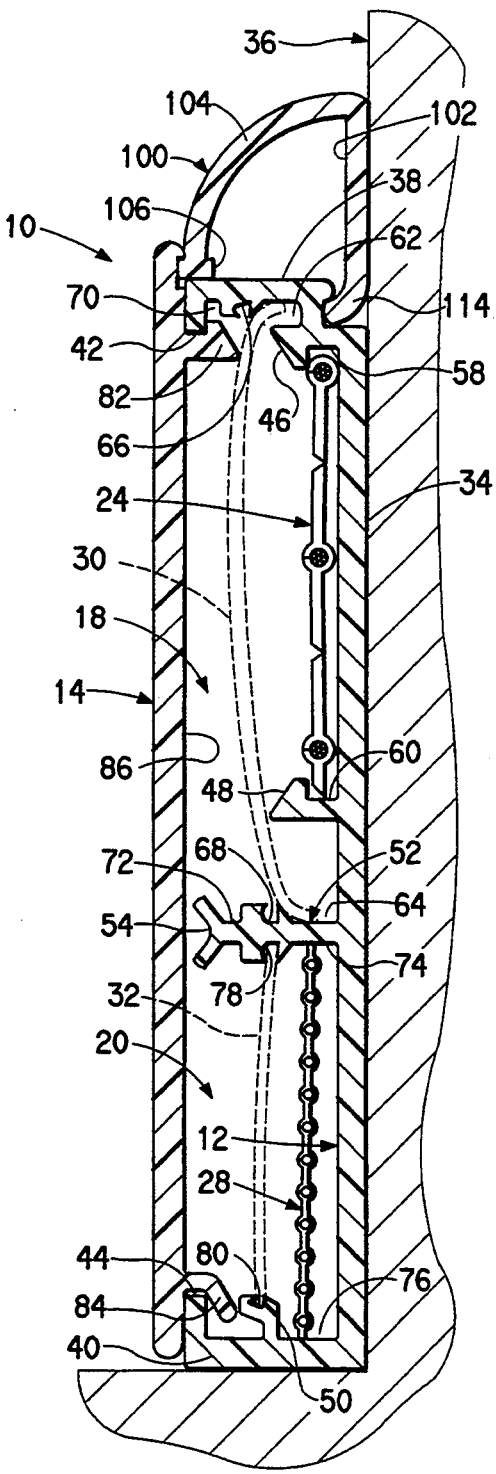

RACEWAY ASSEMBLY FOR POWER AND COMMUNICATIONS CONDUCTORS

FIELD OF THE INVENTION

This invention generally relates to raceways and particularly concerns a raceway assembly comprising a length of elongated conduit enclosing a plurality of continuous conductors.

BACKGROUND OF THE INVENTION

The raceway assembly of this invention is particularly advantageous in arranging for electrical and/or communications connection at selected positions along the raceway. The raceway is normally mounted either as an in-laid unit or along an exposed surface of exterior or interior panels, walls, ceilings or floors of structures such as buildings, mobile homes, airplanes, vans or other units having requirements for electrical and communications conductors in an integrated raceway assembly. Specifically, however, it is contemplated that primary use of the raceway assembly of this invention will be as a surface mounted unit on an interior wall such as along its base board, chair rail or cove molding adjacent a ceiling and would include outlets for both power and communications conductors permitting maximum efficiency in installation as well as ready modification to effect subsequent changeover to meet different power and communications requirements.

Facing ever evolving design criteria, particularly in commercial and residential installations, whether new or renovated, the cost factor, particularly the labor costs of tradesmen involved, has presented a demand for minimal changes in traditional framing methods. The former practice of installing ducts or raceways within specially recessed channels in a wall, e.g., does not permit ready changeover of an existing structure into which power conductors are laid or drawn and onto which power outlets are attached to provide a distributed electrical power system or for the supply of cables or wiring for telecommunications, fiber optics, signal, control or data communications systems herein referred to collectively as communications systems. Another factor has become increasingly important in certain of the different applications to which such raceways have been conventionally used. This factor concerns discouraging tampering and minimizing ill-advised or undesired removal of a raceway cover from its base.

SUMMARY OF THE INVENTION

Accordingly, a primary object of this invention is to provide a new and improved raceway assembly which does not require changes in traditional framing methods or special recesses to be formed in the structure on which it is mounted and is particularly suited to be used in both new construction as well as in renovation of older structures featuring updated power and communications capabilities.

Another object of this invention is provide a new and improved raceway assembly which positively locates power and communications conductors and tap-off connectors associated with such conductors and additionally provides for effective shielding of communications conductors from electromagnetic interference generated along power conductors in such raceways which raceways intentionally integrate different wiring used for significantly different purposes.

A further object of this invention is to provide such a raceway assembly having discrete shielding in the respective power and communications conductor channels wherein the shielding itself may be installed after a wiring installation whereby the installed shielding reduces subsequent costs and time delays in the sequencing of tradesmen. An aim included in this object is to provide for an electrician, e.g., to complete his work and, upon the shielding being installed in both the power and communications channels of the raceway, the electrician then is free to leave and other tradesmen can work in or around the area after the electrician has left. For example, a finish carpenter will be able to come in later at his convenience, after the electrician has left, to make corners, miter the raceway and also prepare for the variety of different types of fittings at the corners of the raceway assembly and other related work projects without requiring the electrician's presence or disturbing the shielded conductors.

A yet further object of this invention is to provide such a raceway assembly wherein the shielding itself may be connected to ground at a service entrance whereby accidental penetration of the shield from whatever source may automatically trip a circuit breaker and deactivate power in an AC power channel.

Another object of this invention is to provide a new and improved raceway assembly which provides for a pleasing aesthetic appearance and quick and easy installation in an assembly particularly designed to prevent undesired disassembly of the raceway.

Yet another object of this invention is to provide an electrical raceway assembly of the type described requiring a two step sequence for accessing the channels within the raceway. Included in this object is the aim of providing an elongated latching member for a base and cover of the raceway wherein the latching member is removably engagable with both the base and its cover in interfering relation therebetween continuously along coextensive lengths of the latching member and the cover.

Other objects will be in part obvious and in Dart pointed out in more detail hereinafter.

A better understanding of the objects, advantages, features, properties and relations of the invention will be obtained from the following detailed description and accompanying drawings which set forth an illustrative embodiment and are indicative of the various ways in which the principles of the invention are employed.

BRIEF DESCRIPTION OF THE DRAWINGS

FIG. 1 is an exploded perspective view, partly broken away, showing a raceway assembly of this invention;

FIGS. 1A and 1B are perspective views, partly broken away, showing alternative forms of a latching member used in the raceway of FIG. 1;

FIG. 2 is an enlarged cross sectional view of a cover of the raceway of this invention;

FIG. 3 is an enlarged cross sectional view of a base of the raceway of this invention;

FIG. 4 is a cross sectional view, showing an assembled raceway of the invention.

DESCRIPTION OF A PREFERRED EMBODIMENT

Figure 5:
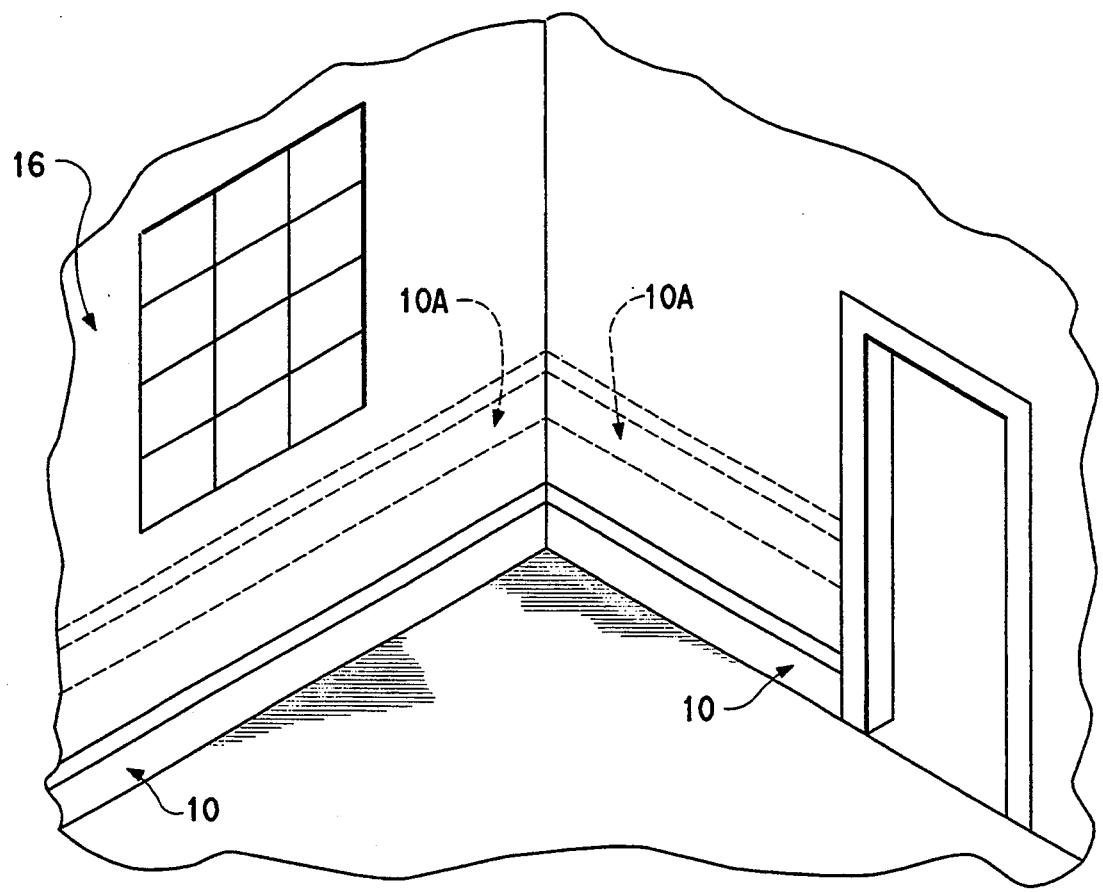
FIG. 5 is a reduced perspective view, partly broken away, schematically showing typical raceway mounting arrangements within a room of a building.

Referring to the drawings wherein the basic components of a raceway assembly of this invention are illustrated, a hollow elongated raceway 10 of a generally rectangular box-section construction is shown which is preferably manufactured of a resilient, non-conductive form-sustaining material such as the plastic material known as GEON 8700A PVC (polyvinylchloride) or the equivalent which may be extruded through dies of appropriate shapes to form a longitudinally extending base 12 and cover 14 of the raceway. It is to be understood that the base 12 may be mounted to a surface, typically, a wall, by any suitable means such as by conventional mounting screws, not shown, whereby the raceway, for example, may be extending about a room 16 as in a baseboard mounting arrangement, as seen at 10 in FIG. 5 in full lines, a chair rail mounting arrangement as seen at 10A in FIG. 5 in broken lines, or other arrangements such as a ceiling cove molding mounting arrangement, a floor panel in an airplane or van, etc., not shown.

For receiving electrical wiring and communications conductors, the base 12 of the preferred embodiment is divided into two or more longitudinally extending parallel channels 18, 20. In the specifically illustrated embodiment, a first or upper channel 18 of the raceway base 12 has a plurality of electrical power conductors 22 or cables 24 disposed within that channel 18 (FIGS. 1 and 4, respectively). A second or lower channel 20 is located in underlying relation to the upper channel 18 of the raceway base 12 for receiving a plurality of communication conductors. A variety of different communications conductors 26 (FIG. 1) may be disposed within the lower channel 20 to be used for telephone wiring, security wiring, fiber optic elements or cabling or any of a variety of other conductors provided, e.g., for transmitting signal or data communications. The communications wiring may be provided in a ribbon cable having a conventional PVC insulating jacket, if desired and as seen at 28 in FIG. 4, or as separate insulated conductors, if desired and as shown at 26 in FIG. 1., conventionally formed as number 24 gage wires. The power conductors with positive, neutral and ground wires, say, of number 14 gage wire may be provided as a ribbon cable assembly 24 (FIG. 4) or as separate conductors 22 as shown disposed in the upper channel 18 of the raceway base 12 in FIG. 1 for transmitting AC power.

To minimize the effects on the communications conductors from electromagnetic interference generated by AC power and other electrical disturbances generated by other devices such as motors and the like or by lightning strikes which disturbances are transmitted through the power conductors, an electrically conductive shield 30 is shown mounted as a discrete element to the base 12. Shield 30 extends longitudinally through the upper channel 18 of the raceway base 12 in overlying relation to the power conductors/cable 22, 24. A second electrically conductive shield 32 is shown mounted as a discrete element to extend longitudinally through the lower channel 20 of the raceway base 12 in overlying relation to the communications conductors/cable 26, 28. Such construction may be used to additionally establish a ground connection to a service entrance, not shown, whereby an accidental penetration of the shield 30 and a current-carrying power conductor, from whatever source, would automatically trip a circuit breaker and deactivate the power in the AC power channel.

While the shields 30, 32 must be conductive to achieve the above mentioned advantages, the shield itself can be made of a variety of different types of material. For example, the shield could be formed as a flat copper or aluminum foil or plate or steel plate. If desired the shield also could be provided as a plastic sheet with conductive particles deposited on the sheet or with a conductive wire mesh embedded in the plastic sheet. Thereafter, the shield 30, 32 is disposed within the respective channels 18, 20 of the raceway base 12 in overlying relation to their conductors/cables to provide the desired mechanical and electrical wiring protection.

By virtue of such raceway design, no changes in traditional framing methods are required nor are there any requirements for stud drilling or notching during installation of the raceway itself which simply requires conventional finishing methods.

As seen in FIG. 3 the raceway base 12 is formed with a flat rear wall 34 suitably configured for direct surface mounting on a wall such as shown at 36 and 16 in FIGS. 4 and 5. That mounting may be not only the illustrated baseboard mounting arrangement but may also be at other locations as noted above in a given structure to provide the desired wiring flexibility. Upper and lower walls 38, 40 of base 12 are shown projecting outwardly in generally perpendicular relation to the rear wall 34 of the base, and each of the upper and lower walls 38, 40 terminates in an inwardly-turned tongue 42, 44 directed toward the tongue of the other wall. It is to be understood that the upper and lower walls 38, 40 coextend with their base rear wall 34 and with a plurality of projecting ribs 46, 48, 50 thereon which longitudinally extend along the base 12 for multiple-use applications in securing wiring, shielding, and wiring and communications device components in the upper and lower channels 18, 20 of the raceway base 12.

In addition, projection 52 protrudes outwardly from rear wall 34 and extends longitudinally along the base 12 intermediate its upper and lower walls 38, 40. Projection 52 terminates in a splayed foot 54 which is engagable with the cover 14 to serve as a stop to maintain the cover in predetermined spaced apart relation relative to base and to prevent undesired flexing of the cover relative to the base, while additionally serving as a partition within the raceway 10 defining the upper and lower raceway channels 18, 20.

To provide quick and easy mounting of clips, shielding, wiring and cable retainers, and other items such as brackets for devices such as the illustrated power outlet shown in FIG. 1 in the form of a duplex receptacle 56 connected to appropriate power conductors 22 extending through the upper raceway channel 18, the channels 18, 20 are preformed with convenient compartments and notches. More specifically, in the upper raceway channel 18, the ribs 46 and 48 respectively define longitudinally extending retention recesses at 58 and 60. The upper wall 38 and an upper surface of the intermediate projection 52 are formed with opposed longitudinally extending compartments shown at 62 and 64, opposed notches shown at 66 and 68, and opposed grooves shown at 70 and 72. The lower raceway channel 20 is illustrated as being formed with suitable opposed retaining compartments 74, 76 and opposed notches 78, 80 longitudinally extending respectively along a bottom surface of the intermediate projection 52 and upstanding rib 50 of the lower wall. It will be recognized by those skilled in the art that the described raceway channels are particularly suited to provide facile mounting for prewired electrical harnesses and integrated cables for quick, low cost installation.

To effect secure and reliable snap attachment of cover 14 onto the base 12, a pair of spaced apart ribs 82, 84 are formed to extend longitudinally along an inside surface 86 of cover 14 adjacent its upper and lower edges with each of the ribs 82, 84 jointly forming with the adjacent inside cover surface 86 an outwardly opening, latching retention groove 88, 90 (FIG. 2). By virtue of such construction, the bottom of the cover 14 then may be manually fitted onto the base 12 with tongue 44 being disposed within the latching retention groove 90 at the bottom of cover 14. Cover 14 may then be bowed out away from the base 12 and an upper portion of the cover pressed inwardly to effect a snap action engagement. Such action releasably secures the tongue 42 of the upper wall 38 of the base 12 within the latching retention groove 88 along the upper portion of the cover, preferably with the assistance of an inclined cam surface 92 along the longitudinally extending rib 82 adjacent the upper cover edge and which surface 92 may be slidingly engaged with a leading edge of tongue 42 during the snap-in attachment of cover 14 onto base 12. With the cover 14 then mounted in attached relation to the base 12, the cover and base are in a "ready position" conditioned to be releasably latched as fully described below.

To remove the cover from the base, a finish end plate, not shown, mounted at an end of the raceway 10 may be removed or a face plate, not shown, for any of the various devices which are installed, such as the illustrated receptacle 56, may be removed to provide access to the interior of the raceway 10 in its ready position. The cover 14 then may be distorted by manually pulling it outwardly away from the upper wall 38 of the base 12 while simultaneously pulling upwardly on upper wall 38 to release the upper tongue and groove engagement between the cover and base, whereupon the cover 14 then may be "un-zippered" longitudinally along the upper edge of the base 12 to remove the cover 14 and provide access to the raceway channels 18, 20.

The cover 14 illustrated in FIG. 1 is shown having a recessed accessory channel 94 longitudinally extending intermediate the upper and lower edges of the cover 14 to provide a multiple-use accessory compartment which could be used for a variety of different applications such as a channel for an appliance cord, low voltage lighting, accent trim, speaker wiring, cable television wiring, extension wiring, security sensor wiring, telephone extensions, "intercom" wiring, a door stop, a night light, an occupancy sensor and other useful applications. An elongated covering 96 as shown in FIG. 1 will be understood to be removably fixed to cover 14 in overlying relation to its accessory channel 94 as a finished trim piece.

In accordance with another feature of this invention, the disclosed raceway construction is particularly designed to prevent undesired removal of the cover 14 absent an intentional preliminary maneuver of first removing a unique latching member in accordance with this invention before the above described procedure of detaching the cover from the base in their ready position may be accomplished.

In the specifically illustrated embodiment, an elongated latching member is illustrated at 100 in FIG. 1 and will be understood to be formed of a resilient, form-sustaining material with a length coextensive with that of the cover 14. The material of the latching member 100 may be similar or identical to that of the base and/or cover members providing that it is resilient and form-sustaining. The latching member 100 is shown having a surface-mountable rear wall 102 and an integral trim face 104 connected with the top of the wall 102 to project outwardly in an arcuate fashion and terminating in a bottom edge formed by an offset latching foot 106 extending the length of the latching member 100. Alternative forms of the latching member are illustrated in FIGS. 1A and 1B wherein trim faces 104A, 104B are illustrated as projecting outwardly from rear walls 102A, 102B in both figures but with the trim face in each figure shown as having a different cross sectional configuration.

For cooperating with the latching member 100 and as best seen in FIG. 2, the cover 14 includes an upper latching lip 108 and an underlying latching recess 110 formed in the inside surface of the cover 14. The latching lip 108 and recess 110 extend longitudinally along the cover with the latching recess 110 disposed above the upper latching retention groove 88 of the cover. With the cover 14 in assembled relation with the base in their ready position, the latching recess 110 of the cover 14 is exposed and accessible just above the top of the upper wall 38 of the base 12 (FIG. 4). The rear juncture of the base 12 between its upper wall 38 and its rear wall 34 is relieved to form a longitudinally extending retaining groove at 112 (FIG. 3).

In accordance with this invention, the latching member 100 may be readily engaged in wedged relation between the assembled base 12 and its cover 14 continuously along coextending lengths of the latching member 100 and the cover 14 after engaging an offset toe 114, formed along a bottom edge of the rear wall 102 of the latching member 100, with the base 12 within its retaining groove 112. To fix the assembly in its latched position, the latching member 100 is first positioned with toe 114 within groove 112 and preferably with its rear wall 102 in coplanar alignment with the rear wall 34 of the base 12 and engaging its mounting surface, such as the wall 36 shown in FIG. 4, in surface-to-surface engagement. The trim face 104 of the resilient latching member 100 is then Dressed inwardly and downwardly to engage its latching foot 106 in abutment with both the base 12 and its cover 14 (in the ready position of the base and cover as illustrated in FIG. 4) to wedge the latching foot 106 within the recess 110 of the cover 14 and in overlapping engagement with the top front edge of the upper base wall 38 to establish a "latched position" of the assembly, whereby the latching member 100 is disposed to interfere with movements of the cover 14 required for its removal and to positively prevent undesired disassembly of the cover 14 relative to the base 12.

Accordingly, when it is desired to gain access to the internal raceway channels 18, 20 with the raceway 10 assembled in latched position with the latching member 100 in interfering relation to cover movements required for removal of the cover 14 relative to the base 12, a first maneuver is required to initially remove the latching member 100 relative to the base and cover. This requires that the trim face 104 of the latching member 100 be intentionally pressed inwardly to free its offset latching foot 106 from within the latching recess 110 under the lip 108 of the cover 14 to then permit removal of the latching member 100, and thereafter permit a second maneuver to be undertaken in detaching the cover 14 as described above from the base 12 in order to gain access to the upper and lower channels 18, 20 of the raceway base 12 with its cover 14 removed.

It will be seen that the latching member 100 may also be used as a channel, if desired, to permit speaker wiring and the like to be used in connecting components in different parts of a room to be tastefully hidden from view within the confines of the latching member 100.

As will be apparent to persons skilled in the art, various modifications, adaptations and variations of the foregoing specific disclosure can be made without departing from the teachings of this invention.

I claim:

1. A wiring management assembly comprising
   a raceway including an elongated base and an elongated removable cover for the base, the base being divided into first and second longitudinally extending raceway channels, the base and cover being interengageable for removably attaching the cover to the base in a ready position, the cover including an upper latching lip and underlying latching recess formed in the inside wall surface of the cover, the latching lip and recess longitudinally extending along the cover, and
   an elongated latching member formed of a resilient, form-sustaining material with a length coextensive with that of the cover, the latching member being removably engageable with the base and its cover continuously along coextending lengths of the base and the cover, the latching member having a rear wall and integral trim face projecting from the top of the rear wall, the trim face having a bottom edge formed by an offset latching foot extending the length of the latching member, the latching foot being in abutting engagement with both the base and its cover in said ready portions and wedged within the latching recess of the cover in a latched position of the assembly, thereby preventing undesired disassembly of the cover relative to the base.

2. The assembly of claim 1 wherein the latching member in said latched position requires a first maneuver of initially removing the latching member relative to the base and cover followed by a second maneuver of detaching the cover from the base in order to gain access to the first and second channels of the raceway base with its covered removed.

3. The assembly of claim 1 wherein electrical power conductors and communications conductors are respectively disposed within the first and second channels of the raceway base.

4. The assembly of claim 1 further including an accessory channel formed in the raceway cover and providing a multiple-use accessory compartment longitudinally extending along the cover.

5. The assembly of claim 4 wherein an elongated covering is provided for the accessory channel, the covering being removably fixed to the cover in overlying relation to the accessory channel.

6. The assembly of claim 1 wherein the latching member cooperates with the base and cover to define a third raceway channel.

7. The assembly of claim 1 wherein the base includes a generally flat, rear wall, and wherein a projection extends longitudinally along the base in outwardly protruding relation to its rear wall, the projection being engageable with the cover to serve as a stop to maintain the cover in predetermined spaced apart relation relative to the base and to prevent undesired flexing of the cover relative to the base, while additionally serving as a partition within the raceway defining said first and second channels.

8. The assembly of claim 1 wherein the base includes a generally flat rear wall having a plurality of projecting ribs thereon longitudinally extending along the base for multiple-use applications in securing conductors, shielding, and wiring and communications device components in said first and second channels.

9. The assembly of claim 1 wherein the base and the cover are each formed of a resilient, form-sustaining material.

10. The assembly of claim 1 wherein the latching member includes an offset toe engageable with an upper rear edge of the base for cooperating in releasably securing the latching member in said latched position.

11. An assembly comprising
    a raceway including an elongated base and an elongated removable cover for the base, the base being divided into first and second longitudinally extending channels for receiving electrical power conductors and communications conductors respectively disposed within the first and second channels of the raceway base,
    a first electrically conductive shield mounted as a discrete element to the base to extend longitudinally through said first channel of the raceway base in overlying relation to the power conductors and for establishing a ground connection to a service entrance, and
    a second electrically conductive shield mounted as a discrete element to the base to extend longitudinally through said second channel of the raceway in overlying relation to the communication conductors, the conductors within the first and second channels of the raceway base thereby being effectively isolated within their respective channels.

12. The assembly of claim 11 further including an accessory channel formed in the raceway cover and providing a multiple-use accessory compartment longitudinally extending along the cover, and an elongated covering removably fixed to the cover in overlying relation to the accessory channel.

13. The assembly of claim 11 wherein the first and second electrically conductive shield members are each shaped and configured as a generally flat member having opposite longitudinally extending edges releasably secured to the base, the shields each being bowed in an outwardly convex relation to their secured edges in overlying relation to the conductors in their respective channels.

14. A wiring management assembly comprising a raceway including an elongated base and an elongated removable cover for the base, the base being divided into first and second longitudinally extending raceway channels,
    electrical power conductors and communications conductors being respectively disposed within the first and second channels of the raceway base,
    a first electrically conductive shield being mounted as a discrete element to the base to extend longitudinally through said first channel of the raceway base in overlaying relation to the power conductors and for establishing a ground connection to a service entrance, and
    an elongated latching member formed of a resilient, form-sustaining material with a length coextensive with that of the cover, the latching member being removably engageable with the base and its cover continuously along coextending lengths of the latching member and the cover, the latching member being positioned in interfering relation to cover movements required for removal of the cover relative to the base, whereby the latching member releasably secures the cover to its base in a latched position of the assembly.

15. The assembly of claim 14 including a second electrically conductive shield mounted as a discrete element to the base to extend longitudinally through said second channel of the raceway base in overlying relation to the communications conductors, the conductors within the first and second channels of the raceway base thereby being effectively isolated within the respective channels.

16. A wiring management assembly comprising a raceway including an elongated base and an elongated removable cover for the base, the base being divided into first and second longitudinally extending raceway channels, and an elongated latching member formed of a resilient, form-sustaining material with a length coextensive with that of the cover, the latching member being removably engageable with the base and its cover continuously along coextending lengths of the latching member and the cover, the latching member being positioned in interfering relation to cover movements required for removal of the cover relative to the base, whereby the latching member releasably secures the cover to its base in a latched position of the assembly, the base including a generally flat, rear wall having integral upper and lower walls projecting therefrom in generally perpendicular relation to the rear wall, the upper end lower walls each having an inwardly-turned tongue directed toward the tongue of the other wall, the cover including an inside wall surface with a pair of spaced apart ribs longitudinally extending along the cover adjacent its upper and lower edges and forming a pair of outwardly opening latching retention grooves thereon, the tongues of the base and grooves of the cover being interengageable for removably attaching the cover to the base in a ready position preliminary to being secured by the latching member in latched position, the cover including an upper latching lip and underlying latching recess formed in the inside wall surface of the cover, the latching lip and recess longitudinally extending along the cover with the latching recess disposed above the upper latching retention groove of the cover, the latching member having a rear wall and integral trim face projecting from the top of the rear wall, the trim face having a bottom edge formed by an offset latching foot extending the length of the latching member, the latching foot being in abutting engagement with both the base and its cover in their ready position and wedged within the latching recess of the cover in said latched position of the assembly, thereby preventing undesired disassembly of the cover relative to the base.

17. The assembly of claim 16 wherein the rear wall of the base and the rear wall of the latching member are in coplanar alignment when the assembly is in latched position.

* * * * *

UNITED STATES PATENT AND TRADEMARK OFFICE
Certificate

Patent No. 5,336,849

Patented: August 9, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: William J. Ashline, Bristol, Conn.; and Charles A. Whitney, Canton, Conn.

Signed and Sealed this Seventeenth Day of November, 1998.

PETER VO, *Acting SPE*
Art Unit 3729